(12) United States Patent
Przestrzelski

(10) Patent No.: US 10,936,401 B2
(45) Date of Patent: Mar. 2, 2021

(54) DEVICE OPERATION ANOMALY IDENTIFICATION AND REPORTING SYSTEM

(71) Applicant: Dell Products L.P., Round Rock, TX (US)

(72) Inventor: Piotr Przestrzelski, Rathcormac County (IE)

(73) Assignee: Dell Products L.P., Round Rock, TX (US)

( * ) Notice: Subject to any disclaimer, the term of this patent is extended or adjusted under 35 U.S.C. 154(b) by 114 days.

(21) Appl. No.: 16/053,385

(22) Filed: Aug. 2, 2018

(65) Prior Publication Data

US 2020/0042373 A1 Feb. 6, 2020

(51) Int. Cl.
*G06F 11/00* (2006.01)
*G06F 11/07* (2006.01)
*G06F 21/56* (2013.01)

(52) U.S. Cl.
CPC ........ *G06F 11/079* (2013.01); *G06F 11/0751* (2013.01); *G06F 11/0769* (2013.01); *G06F 11/0775* (2013.01); *G06F 21/56* (2013.01)

(58) Field of Classification Search
CPC combination set(s) only.
See application file for complete search history.

(56) References Cited

U.S. PATENT DOCUMENTS

| 7,076,695 B2 * | 7/2006 | McGee | G06F 11/0709 |
| | | | 702/179 |
| 9,378,112 B2 * | 6/2016 | Banerjee | G06F 11/3495 |

OTHER PUBLICATIONS

Chao Yang, Zengyou He and Weichuan Yu, "Comparison of Public Peak Detection Algorithms for MADLI Mass Spectrometry Data Analysis," Jan. 6, 2009, 18 Pages, PMCID: PMC2631518, PMID: 19126200, Published Online DOI: 10.1186/1471-2105-10-4, BioMed Central Ltd., Hong Kong, China, https://www.ncbi.nlm.nih.gov/pmc/articles/PMC2631518 2009

Lovro Iliassich, "Clustering Algorithms: From Start to State of the Art, Clustering Algorithms: K-Means, EMC and Affinity Propagation—Toptal," 201—2018, 19 Pages, Toptal, LLC, https://www.toptal.com/machine-learning/clustering-algorithms 2010

* cited by examiner

*Primary Examiner* — Amine Riad
(74) *Attorney, Agent, or Firm* — Haynes and Boone, LLP

(57) ABSTRACT

A device operation anomaly identification and reporting system includes device that generates an operating metric data stream. A management system is coupled to the device and receives and analyzes the operating metric data stream. The management system identifies peaks present in the operating metric data stream, and determines a peak height and a peak area for each of the peaks. The management system then clusters the peaks into height clusters based on their heights, and clusters the peaks into area clusters based on their areas. The management system then defines an operating periodicity for the device based on the height clusters and area clusters, and when the management system detects an operating anomaly in the device using the operating periodicity defined for the device, it generates and transmits an operating anomaly alert that reports the operating anomaly in the device.

16 Claims, 9 Drawing Sheets

DEVICE OPERATION ANOMALY IDENTIFICATION AND REPORTING SYSTEM

BACKGROUND

The present disclosure relates generally to information handling systems, and more particularly to identifying and reporting anomalies in the operation of information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include devices and/or other subsystems that may be monitored to identify and report anomalies in the operation of those devices. For example, a processing system in a server computing device may be monitored to determine physical conditions such as its temperature, or other operating parameters such as its usage (e.g., related to a storage device, a memory device, a network device, an application, etc.), and then anomalies in the operation of the processing system may then be identified and reported to a user of the server computing device. Similarly, the use of a computer network at different protocol levels (e.g., Ethernet frames, Transmission Control Protocol/Internet Protocol (TCP/IP) packages, emails, etc.) may be monitored to determine the communication frequency, communication size, or other communication parameters, and then anomalies in communications via the computing devices may then be identified and reported to an administrator of the computing devices.

Often, the operations, communications, or other device metrics being monitored will include essential features that are generally periodic in nature in that those essential features are present each period even if they do not repeat in exactly the same way each period, along with accidental features such as noise, distortions, and/or other artifacts that impact the metrics being monitored. Typically, a human user may recognize such generally periodic features (i.e., distinguish those generally periodic features from the noise) when the monitored parameters are graphed, but providing for human analysis of monitored metrics for purpose of identifying periodic features so that anomalies can then be detected is not feasible when a system produces thousands (or tens of thousands) of metrics during operation. As such, the determination of periodic device operating characteristics, period device communication characteristics, and/or other periodic device operating metrics for the purpose of identifying and reporting anomalies in those device operating characteristics, communication characteristics, and/or other device operating metrics is a manual, time-consuming process that cannot be applied generally to complex systems that produce a relatively large number of metrics during operation.

Accordingly, it would be desirable to provide an automated system for determining a periodicity of a monitored device(s) based on operating metrics for those device(s), and using that device operating periodicity to identify and report anomalies in the operation of those devices. As discussed below, the knowledge of the period length of a metric allows for the calculation of an expected shape of the metric for the entire period based on the historical values for each sampling point of the period (e.g., an average value plus/minus standard distribution boundaries for each sampling point of the period will create a "pipe" of expected values throughout the period). Furthermore, the expected structure of the metric cycle (e.g., the number and time location of essential features (like peaks) of the metric), as well as approximate number of accidental features, may be determined.

SUMMARY

According to one embodiment, an Information Handling System (IHS) includes a processing system; and a memory system that is coupled to the processing system and that includes instructions that, when executed by the processing system, cause the processing system to provide a device operation anomaly identification and reporting engine that is configured to receive, from a device, an operating metric data stream that is generated by the device during operation of the device; analyze the operating metric data stream over a time period; identify a plurality of peaks present in the operating metric data stream during the time period; determine, for each of the plurality of peaks, a peak height and a peak area; cluster the plurality of peaks into a plurality of height clusters based on the peak height determined for each of the plurality of peaks; cluster the plurality of peaks into a plurality of area clusters based on the peak area determined for each of the plurality of peaks; define an operating periodicity for the device based on the plurality of height clusters and the plurality of area clusters; detect an operating anomaly in the device using the operating periodicity defined for the device; and generate and transmit an operating anomaly alert that reports the operating anomaly in the device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, industrial controller (a computer system having no human interface and configured to control some industrial process such as manufacturing, quality checks, etc.), or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
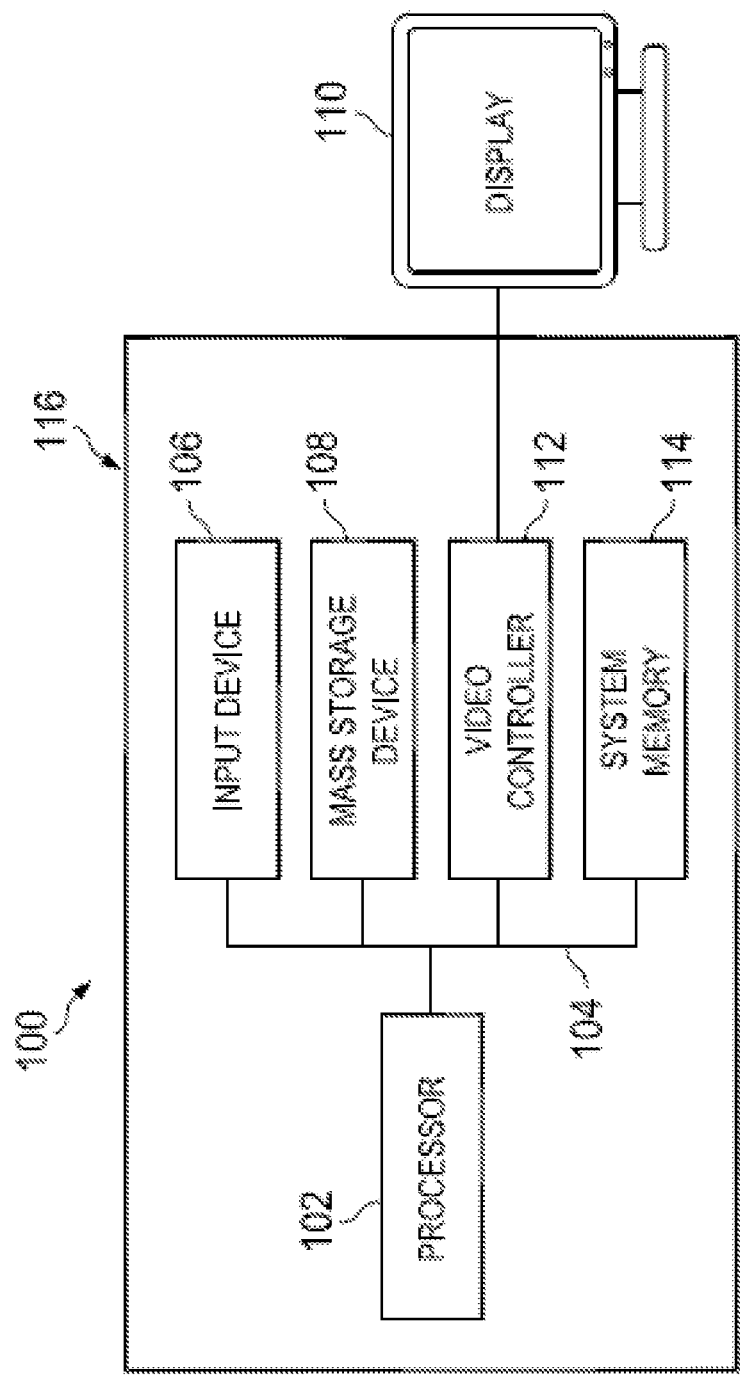
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
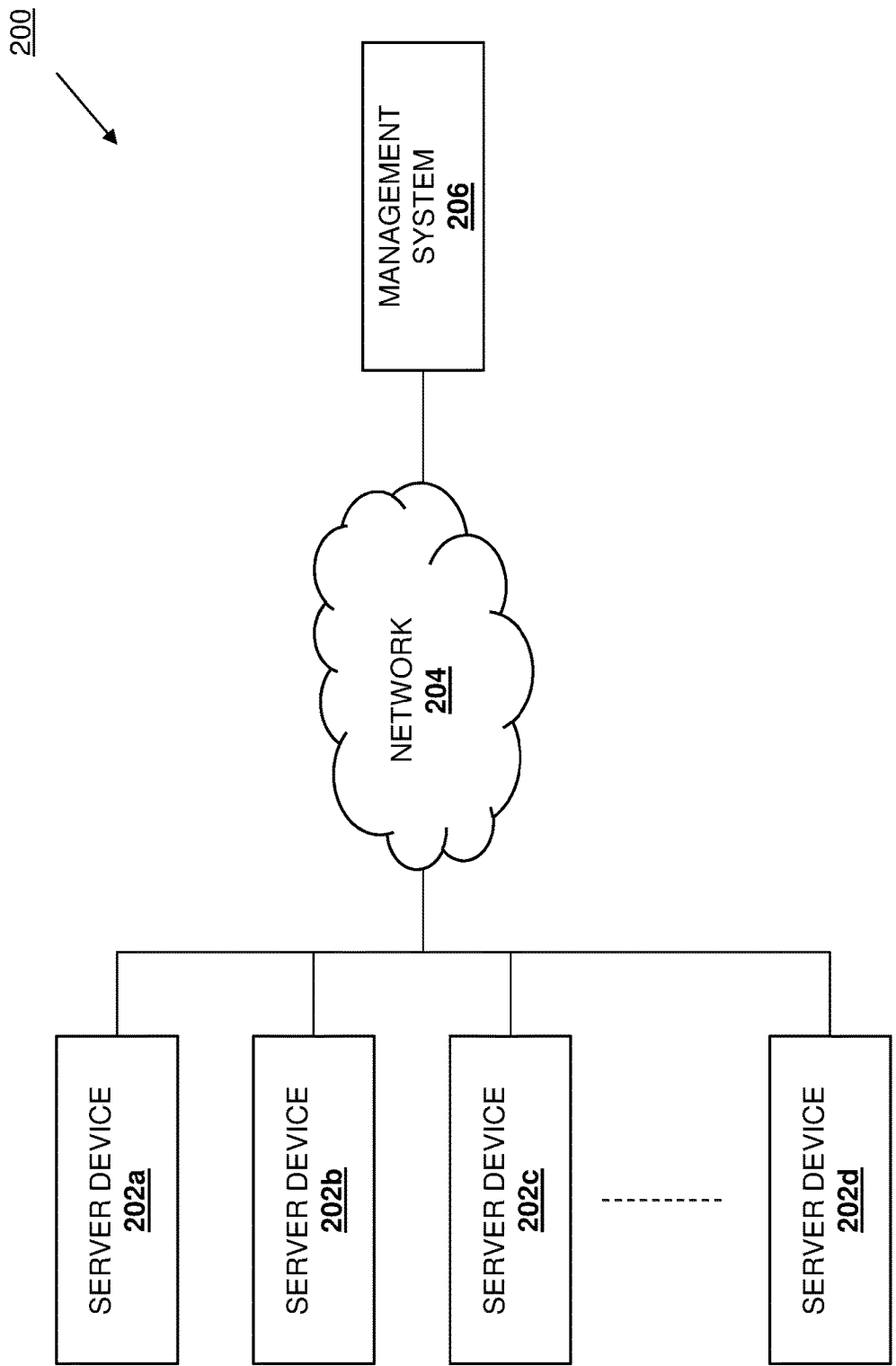
FIG. 2 is a schematic view illustrating an embodiment of a device operation anomaly identification and reporting system.

Referring now to FIG. 2, an embodiment of a device operation anomaly identification and reporting system 200 is illustrated. In the illustrated embodiment, the device operation anomaly identification and reporting system 200 includes a plurality of server devices such as, for example, the server devices 202a, 202b, 202c, and up to 202d in FIG. 2. Any or all of the server devices 202a-d may be provided by the IHS 100 discussed above with reference to FIG. 1, and/or may include some or all of the components of the IHS 100. In a specific example, the server devices 202a-d may be provided in a datacenter. However, one of skill in the art in possession of the present disclosure will recognize that any or all of the server devices 202a-d may be replaced by networking devices (e.g., switch devices, router devices, access point devices, etc.), industrial controllers, storage devices, and/or other computing devices while remaining within the scope of the present disclosure as well.

In the illustrated embodiment, the server devices 202a-d are coupled to a network 204, which one of skill in the art in possession of the present disclosure will recognize may be provided by a Local Area Network (LAN), but which may be provided by the Internet and/or other networks/network combinations while remaining within the scope of the present disclosure as well. A management system 206 is coupled to the network 204, and is configured to communicate with the server devices 202a-d via the network 204. In an embodiment, the management system 206 may be provided by the IHS 100 discussed above with reference to FIG. 1, and/or may include some or all of the components of the IHS 100. As discussed below, the embodiment of the device operation anomaly identification and reporting system 200 illustrated in FIG. 2 provides an example of the teachings of the present disclosure implemented in a datacenter, with the management system 206 configured to monitor the operation of any or all of the server devices 202a-d to define an operating periodicity for that/those server device(s), and then detect operating anomalies in that/those server device(s) using their corresponding operating periodicity. As such, the embodiment illustrated in FIG. 2 allows the management system to detect anomalies associated with processing performed by the server device(s) (e.g., to determine whether a server device has been infected with malware that causes that server device to underperform), to detect anomalies associated with emails sent by connected client device (and handled by the server device(s)), and/or to detect any other anomaly associated with the operation of the server devices that would be apparent to one of skill in the art in possession of the present disclosure. As such, one of skill in the art in possession of the present disclosure will recognize that the particular examples of the defining of device operating periodicity and the identifying and reporting of device operating anomalies, discussed below, are simply illustrative of a wide variety of device operating periodicity and device operating anomaly identification and reporting that may be performed with any computing device known in the art using the teachings of the present disclosure.

Figure 3:
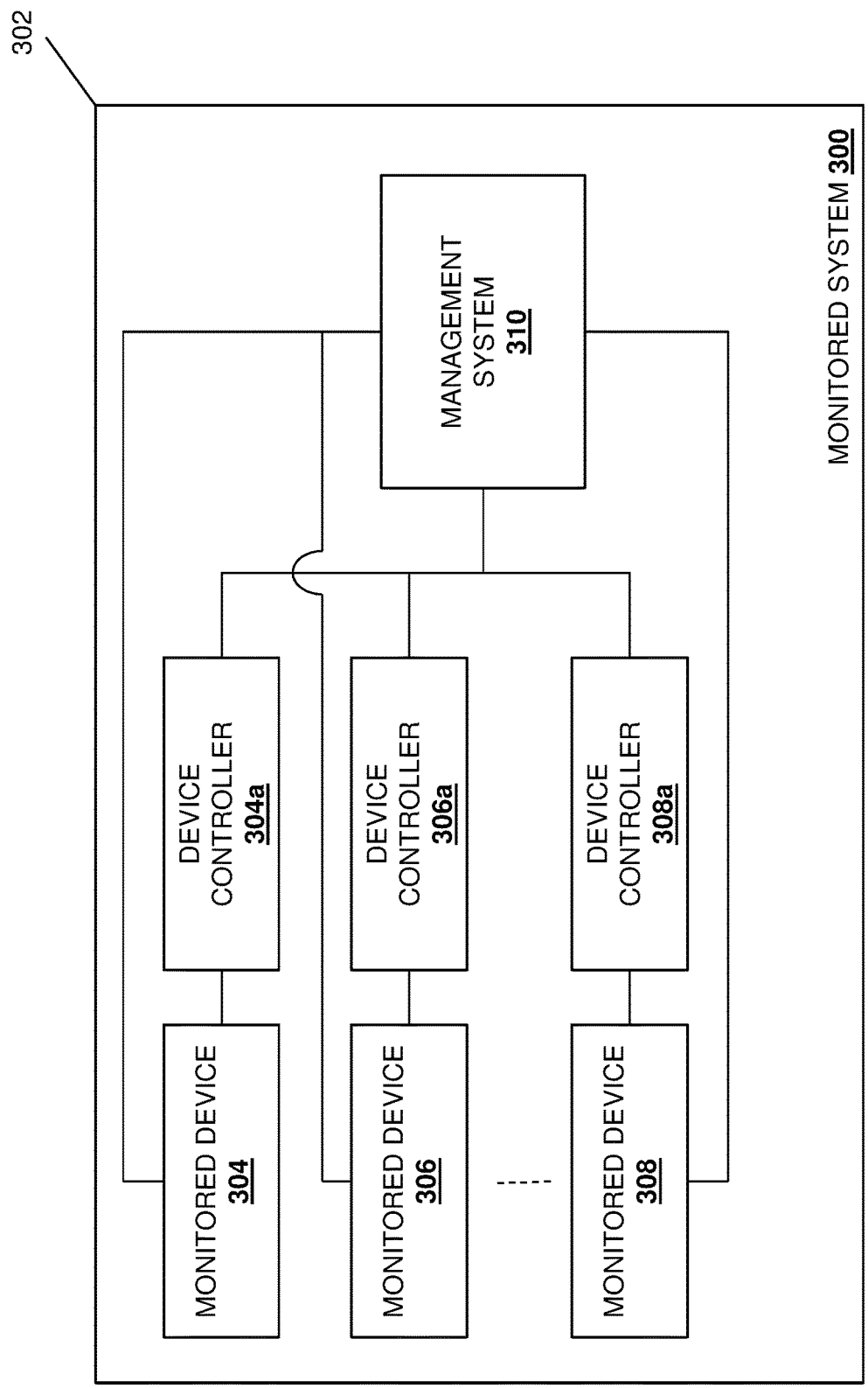
FIG. 3 is a schematic view illustrating an embodiment of a monitored system that may implement the device operation anomaly identification and reporting system of the present disclosure.

Referring now to FIG. 3, another embodiment of a device operation anomaly identification and reporting system is illustrated that is provided in a monitored system 300 that includes a chassis 302 that houses the components of the monitored system 300, only some of which are illustrated in FIG. 3. In an embodiment, the monitored system 300 may be provided by the IHS 100 discussed above with reference to FIG. 1, and/or may include some or all of the components of the IHS 100. In a specific example, the monitored system may be provided by a server device, a networking device, a storage device, a desktop computing device, a laptop/notebook computing device, a tablet computing device, a mobile phone, an industrial controller, or any other computing device that would be apparent to one of skill in the art in possession of the present disclosure. In the illustrated embodiment, the chassis 302 houses the monitored devices 304, 306, and up to 308 in FIG. 3. However, one of skill in the art in possession of the present disclosure will recognize that the monitored system 300 may include a single monitored device (e.g., a processor) or any number of monitored devices while remaining within the scope of the present disclosure as well.

In the illustrated embodiment, each of the monitored devices 304, 306, and 308 are coupled to respective device controllers 304a, 304b, and 304c, although one of skill in the art in possession of the present disclosure will recognize that the device controllers may be integrated into the monitored devices while remaining within the scope of the present disclosure as well. A management system 310 is coupled to each of the monitored devices 304-308 and each of the device controllers 304a-308a, and is configured to communicate with the monitored devices 304-308 and/or control the monitored devices via their respective device controllers 304a-308a. As discussed below, the embodiment of the device operation anomaly identification and reporting system 300 illustrated in FIG. 3 provides an example of the teachings of the present disclosure implemented in a single chassis (e.g., to perform device operation anomaly identification and reporting on one or more devices housed in the chassis), with the management system 310 configured to monitor the operation of any or all of the monitored devices 304-308 to define an operating periodicity for that/those monitored device(s), and then detect operating anomalies in that/those monitored device(s) using their corresponding operating periodicity. As such, the embodiment illustrated in FIG. 3 allows the management system to detect anomalies associated with processing performed by a processing system in the monitored system 300 (e.g., to determine whether the monitored system has been infected with malware that causes that monitored system to underperform), to detect anomalies associated with frames, packages, and/or emails sent by monitored system, to detect anomalies associated with the temperature of a processing system in the monitored system 300, and/or to detect any other anomaly associated with the operation of the monitored system that would be apparent to one of skill in the art in possession of the present disclosure. As such, one of skill in the art in possession of the present disclosure will recognize that the particular examples of the defining of device operating periodicity and the identifying and reporting of device operating anomalies, discussed below, are simply illustrative of a wide variety of device operating periodicity and device operating anomaly identification and reporting that may be performed with any computing device known in the art using the teachings of the present disclosure.

Figure 4:
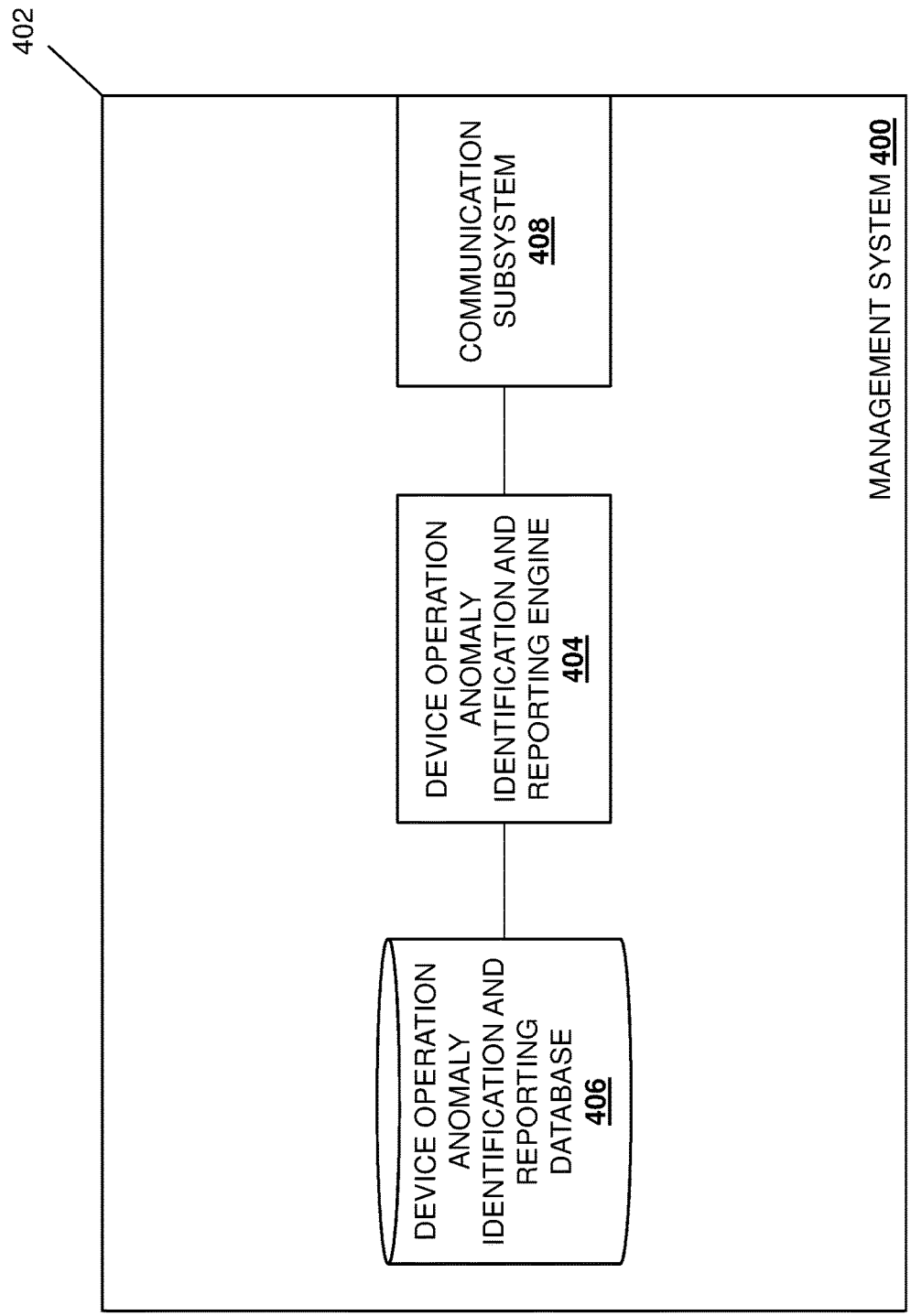
FIG. 4 is a schematic view illustrating an embodiment of a management system that may be provided in the device operation anomaly identification and reporting system of FIG. 2.

Referring now to FIG. 4, an embodiment of a management system 400 is illustrated that may be the management system 206 discussed above with reference to FIG. 2, the management system 310 discussed above with reference to FIG. 3, and/or any other management systems configured to perform the functions discussed below. As illustrated, the management system 400 may include a chassis 402 that houses the components of the management system 400, only some of which are illustrated in FIG. 4. One of skill in the art in possession of the present disclosure will recognize that the chassis 402 may be provided with the management system 400 when it is used to provide the management system 206 discussed above with reference to FIG. 2, and that chassis 402 may be omitted when the management system 400 is used to provide the management system 310 (i.e., when the components of the management system 400 may be housed in the chassis 302 of the monitored system 300.)

For example, the management system 400 may include a processing system (not illustrated, but which may include the processor 102 discussed above with reference to FIG. 1) that is coupled to a memory system (not illustrated, but which may include the memory 114 discussed above with reference to FIG. 1) that includes instructions that, when executed by the processing system, cause the processing system to provide a device operation anomaly identification and reporting engine 404 that is configured to perform the functions of the device operation anomaly identification and reporting engines and management systems discussed below. The management system 400 may also include a storage system (not illustrated, but which may include the storage device 108 discussed above with reference to FIG. 1) that is coupled to the device operation anomaly identification and reporting engine 404 (e.g., via a coupling between the storage system and the processing system) and that includes a device operation anomaly identification and reporting database 406 that is configured to include any of the information utilized by the device operation anomaly identification and reporting engine 404 as discussed below.

The management system 400 may also include a communication subsystem 408 that is coupled to the device operation anomaly identification and reporting engine 404 (e.g., via a coupling between the communication subsystem 408 and the processing system) and that may include a Network Interface Controller (NIC) and/or a wireless communication subsystem (e.g., a BLUETOOTH® wireless communication subsystem, a Near Field Communication (NFC) wireless subsystem, etc.) when, for example, the management system 400 is used as the management system 206 that communicates via the network 204. The management system 400 may instead include the communication subsystem 408 provided as a communication bus when, for example, the management system 400 is used as the management system 310 that is housed in the chassis 302 of the monitored system 300. While a specific example has been illustrated and described, one of skill in the art in possession of the present disclosure will recognize that management systems may include other components and/or component configurations for providing conventional management functionality, as well as the functionality discussed below, while remaining within the scope of the present disclosure as well.

Figure 5:
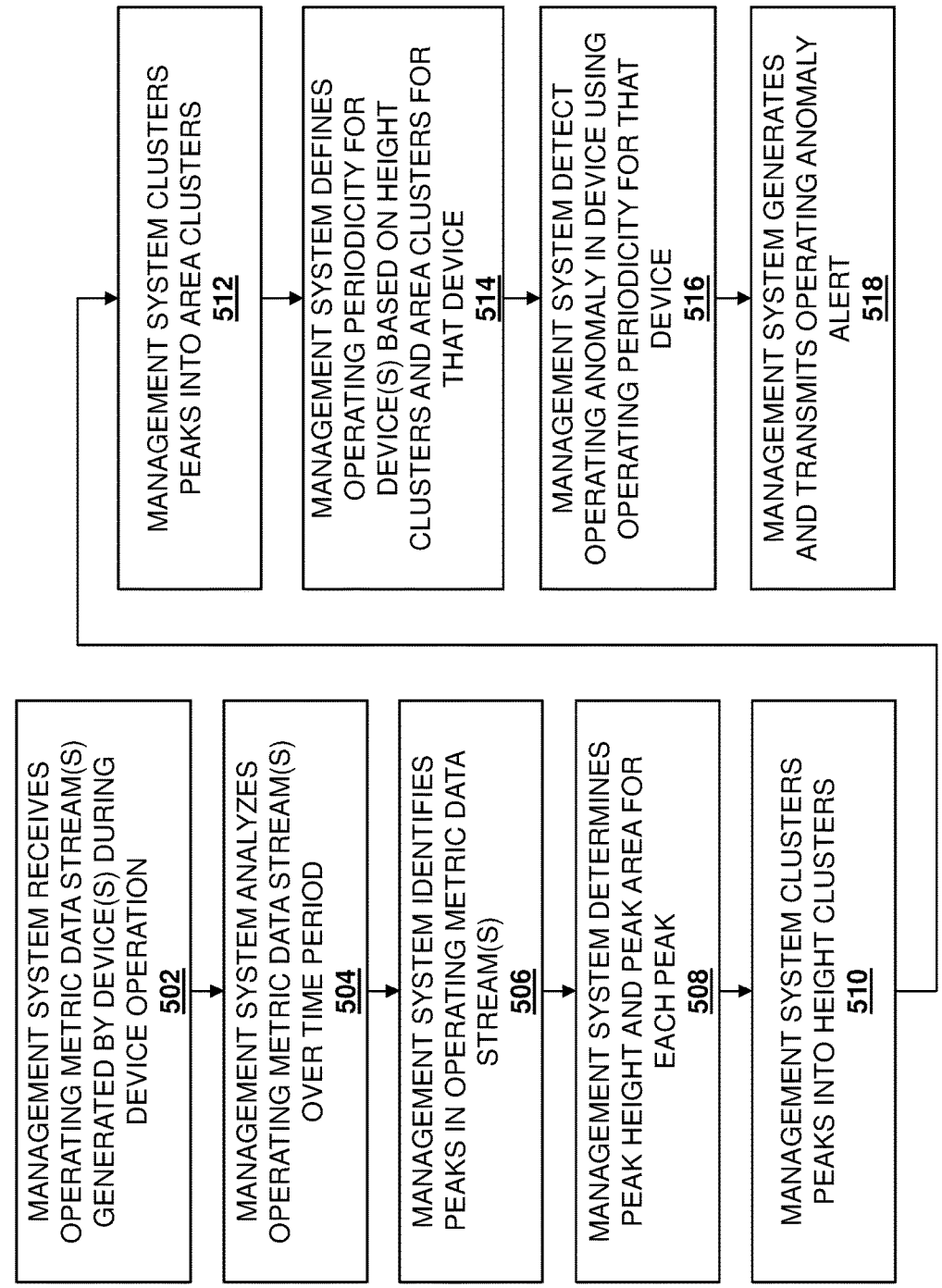
FIG. 5 is a flow chart illustrating an embodiment of a method for identifying and reporting anomalies in device operation.

Referring now to FIG. 5, an embodiment of a method 500 for detecting and reporting device operation anomalies is illustrated. As discussed below, the systems and methods of the present disclosure provide for the identification and reporting of device operation anomalies by first automatically defining an operating periodicity for a device. As a device operates, it provides a device operating metric data stream that corresponds to a metric for which the operating periodicity for the device is being determined. A management system automatically analyzes that device operating metric data stream to identify peaks present in the device operating metric data stream, and automatically determines a peak height and a peak area for each of those peaks. The management device may then automatically cluster the peaks into height clusters (i.e., based on the height determined for each peak) and area clusters (i.e., based on the area determined for each peak), and define an operating periodicity for the device using the height clusters and area clusters. Using that operating periodicity, the management system may then detect operating anomalies in the device by, for example, detecting when an observed operating metric value is outside of a positive and negative deviation from an expected operating metric value according to the operating periodicity of the device. When the operating anomaly is detected, the management system may generate and transmit an operating anomaly alert that reports the operating anomaly in the device and, in some embodiments, provides for the modification of the operation of the device. As such, the determination of periodic device operating characteristics, periodic device communication characteristics, and/or other periodic device operating metrics may be automated and used to identify and report anomalies in those device operating characteristics, communication characteristics, and/or other device operating metrics, allowing for device operation anomaly identification and reporting in systems that produce relatively large amounts of metrics that are desirable to monitor.

The method 500 begins at block 502 where a management system receives operating metric data stream(s) generated by device(s) during their device operation. With reference to FIG. 2, in an embodiment of block 502, any or all of the server devices 202a-202d may operate and, in response, generate a respective operating metric data stream, and transmit that operating metric data stream through the network 204 to the management system 206 such that it is received by the device operation anomaly identification and reporting engine 404 via the communication subsystem 408. For example, with reference to FIG. 2, at block 502 each of the server devices 202a-d may operate their respective processing systems in response to instructions (e.g., received via applications running on the server devices 202a-d, received from client devices coupled to the network 204, etc.), and the operation of the processing system in each server device may cause a respective processing system operating metric data stream to be generated and transmitted through the network 204 to the management system 206 such that it is received by the device operation anomaly identification and reporting engine 404 via the communication subsystem 408. In another example, at block 502, each of the server devices 202a-d may operate to process emails (e.g., received from client devices coupled to the network 204, etc.), and the email processing operations in each server device may cause a respective email processing metric data stream to be generated and transmitted through the network 204 to the management system 206 such that it is received by the device operation anomaly identification and reporting engine 404 via the communication subsystem 408. While a few server device operations have been described, one of skill in the art in possession of the present disclosure will recognize that server devices may perform any of a wide variety of operations, and any of those operations may result in a operating metric data stream being generated and transmitted through the network 204 to the management system 206 while remaining within the scope of the present disclosure as well.

With reference to FIG. 3, in an embodiment of block 502, any or all of the monitored devices 304-308 may operate and, in response, generate a respective operating metric data stream, and transmit that operating metric data stream to the management system 310 such that it is received by the device operation anomaly identification and reporting engine 404 via the communication subsystem 408. For example, at block 502, each of the monitored devices 304-308 may be processing subsystems that operate in response to instructions (e.g., received via applications running on the monitored system 300, received from input devices coupled to the monitored system 300, etc.), and the operation of the processing subsystems may cause a respective processing subsystem operating metric data stream to be generated and transmitted to the management system 310 such that it is received by the device operation anomaly identification and reporting engine 404 via the communication subsystem 408. In another example, at block 502, any or all of the monitored devices 304-308 may operate to generate heat (e.g., a processing system generating heat, a memory system generating heat, etc.), and the heat generation operations in each monitored device 304-308 may cause a respective heat generation metric data stream to be generated and transmitted to the management system 310 such that it is received by the device operation anomaly identification and reporting engine 404 via the communication subsystem 408. While a few monitored device operations have been described, one of skill in the art in possession of the present disclosure will recognize that monitored devices may perform any of a wide variety of operations, and any of those operations may result in a operating metric data stream being generated and transmitted to the management system 310 while remaining within the scope of the present disclosure as well.

The method 500 then proceeds to block 504 where the management system automatically analyzes the operating metric data stream(s) over a time period (e.g., historical data resulting from the operating metric data stream(s)). In an embodiment, at block 504, the management system (e.g., used to provide the management system 206 or the management system 310) may receive the operating metric data stream(s) generated and transmitted by the server device(s) 202a-d or the monitored device(s) 304-308 over some time period (e.g., historical data resulting from the operating metric data stream(s)), and then operate to analyze those operating metric data stream(s). With reference to the example discussed above with regard to FIG. 2, at block 504 the device operation anomaly identification and reporting engine 404 in the management system 206/400 may analyze the processing system operating metric data stream(s) generated based on the operation of the processing system in the server device(s) 202a-d over a time period (e.g., an hour, a day, a week, a month, a year, etc.) (e.g., historical data resulting from the operating metric data stream(s)). With reference to another example discussed above with regard to FIG. 2, at block 504 the device operation anomaly identification and reporting engine 404 in the management system 206/400 may analyze the email processing metric data stream(s) generated based on the email processing operations in the server device(s) 202a-d over a time period (e.g., an hour, a day, a week, a month, a year, etc.) (e.g., historical data resulting from the operating metric data stream(s)).

With reference to the example discussed above with regard to FIG. 3, at block 504 the device operation anomaly identification and reporting engine 404 in the management system 310/400 may analyze the processing subsystem operating metric data stream(s) generated based on the operation of the processing subsystems in the monitored device(s) 304-308 over a time period (e.g., an hour, a day, a week, a month, a year, etc.) (e.g., historical data resulting from the operating metric data stream(s)). With reference to another example discussed above with regard to FIG. 3, at block 504 the device operation anomaly identification and reporting engine 404 in the management system 206/400 may analyze heat generation metric data stream(s) generated based on the heat generation operations in the monitored device(s) 304-308 over a time period (e.g., an hour, a day, a week, a month, a year, etc.) (e.g., historical data resulting from the operating metric data stream(s)). While the analysis of a few specific operating metric data streams over a few specific time periods has been described, one of skill in the art in possession of the present disclosure will recognize that a wide variety of operations may be performed by the server devices 202a-d or monitored devices 304-308 over different periods of time, and operating metric data streams may be analyzed over virtually any period of time of interest while remaining within the scope of the present disclosure as well. Furthermore, the automatic analysis of the operating metric data streams by the management system may be performed for a large number of operating metrics generated by the operation of a device or devices, and thus the automation of that analysis (i.e., the performance of that analysis by the management system without contemporaneous instruction to do so from a user) may provide for the analysis of operating metric data streams associated with any operating metric produced due to the operation of the device(s).

The method 500 then proceeds to block 506 where the management system automatically identifies peaks in the operating metric data stream(s). In some embodiments, at block 506, the device operation anomaly identification and reporting engine 404 in the management system 400 may operate to detect peaks in any particular operating metric data stream(s) analyzed at block 504, while in other embodiments, the device operation anomaly identification and reporting engine 404 in the management system 400 may operate to detect peaks in a combination of operating metric data stream(s) analyzed at block 504. For example, in some situations, the operation of the processing system in each of the server devices 202a-d over a time period may be of interest, and thus the processing system operating metric data stream generated by each of those server devices 202a-d may be analyzed separately to identify peaks in each of those processing system operating metric data streams separately. Furthermore, in other situations, the operation of the processing systems across the server devices 202a-d over a time period may be of interest (e.g., the processing operations performed by the entire datacenter), and thus the processing system operating metric data streams generated by those server devices 202a-d may be analyzed together to identify peaks in those processing system operating metric data streams together. Similarly, in some situations, the email processing operations in each of the server devices 202a-d over a time period may be of interest, and thus the email processing metric data stream generated by each of those server devices 202a-d may be analyzed separately to identify peaks in each of those email processing operating metric data streams separately. Furthermore, in other situations, the email processing operations across the server devices 202a-d over a time period may be of interest, and thus the email processing operating metric data streams generated by those server devices 202a-d may be analyzed together to identify peaks in those email processing operating metric data streams together.

In another example, in some situations, the operation of each of the different processing subsystems/monitored devices 304-308 in the monitored system 300 over a time period may be of interest, and thus the processing subsystem operating metric data stream generated by each of those processing subsystems/monitored devices 304-308 may be analyzed separately to identify peaks in each of those processing subsystem operating metric data streams separately. Furthermore, in other situations, the combined operation of the processing subsystems/monitored device 304-308 in the monitored system 300 over a time period may be of interest, and thus the processing subsystem operating metric data streams generated by those server devices 202a-d may be analyzed together to identify peaks in those processing subsystem operating metric data streams together. Similarly, in some situations, the heat generation operations of each of the different monitored devices 304-308 in the monitored system 300 over a time period may be of interest, and thus the heat generation metric data stream generated by each of those monitored devices 304-308 may be analyzed separately to identify peaks in each of those heat generation operating metric data streams separately. Furthermore, in other situations, the heat generation operations across the monitored devices 304-308 over a time period may be of interest, and thus the heat generation operating metric data streams generated by those monitored devices 304-308 may be analyzed together to identify peaks in those heat generation operating metric data streams together.

Figure 6:
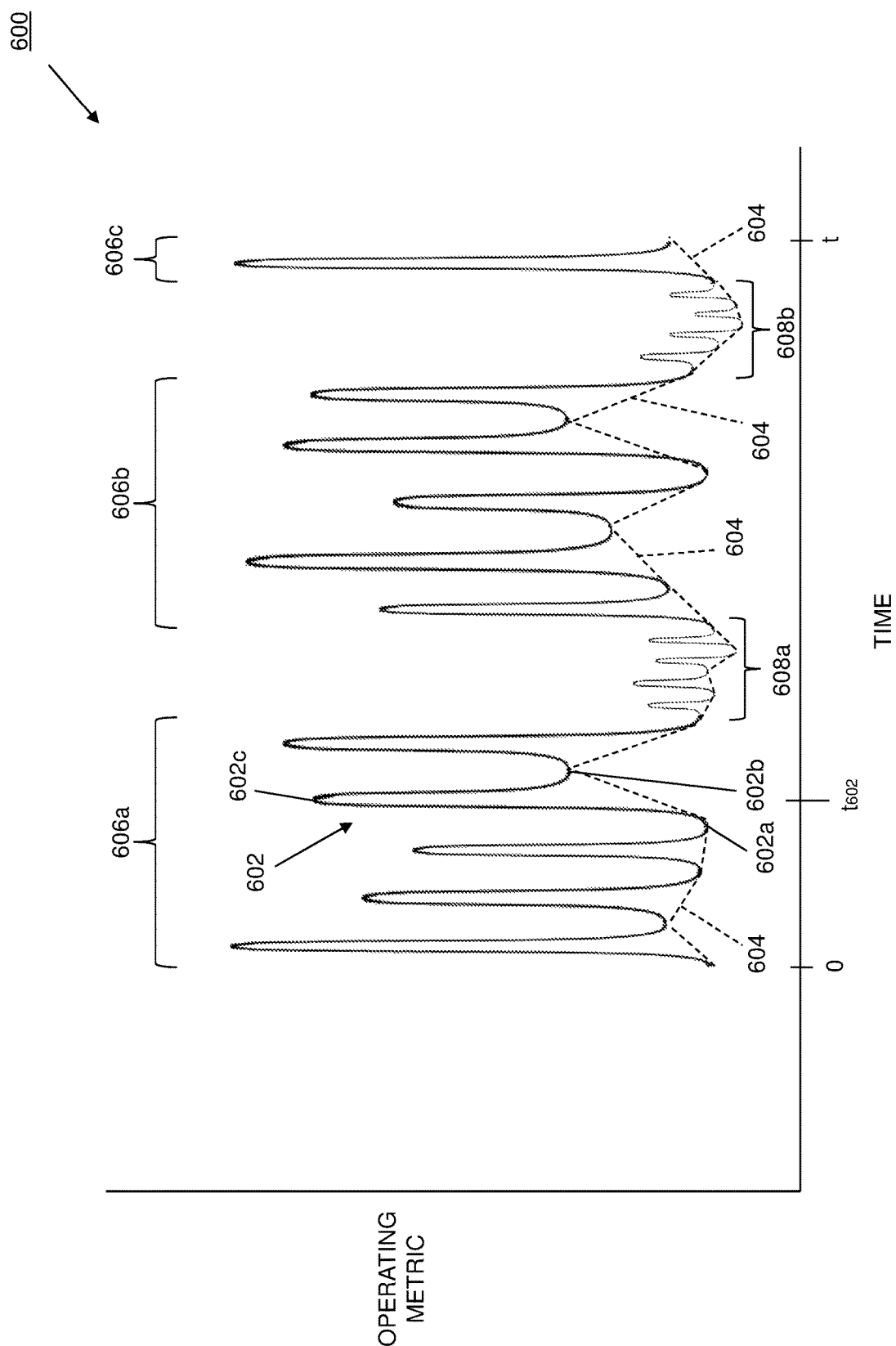
FIG. 6 is a graph view illustrating an embodiment of a operation metric data stream generated from the operation of a device.

In some embodiments, the device operation anomaly identification and reporting engine 404 in the management system 400 may operate at block 506 to identify peaks in an operating metric data stream by identifying Gaussian-like distributions in operating metric data stream(s) being analyzed, and then identifying the peak in each of those Gaussian-like distributions. For example, with reference to FIG. 6, an operating metric data stream 600 over a time period from 0 to t is illustrated, and that the operating metric data stream 600 may represent any of the examples of the operating metric data stream discussed above. One of skill in the art in possession of the present disclosure will recognize that the operating metric data stream 600 illustrated in FIG. 6 includes a plurality of Gaussian-like distributions that include corresponding peaks. For example, a Gaussian-like distribution 602 in the operating metric data stream 600 includes a beginning 602a, an ending 602b, and a peak 602c, and one of skill in the art in possession of the present disclosure will recognize the other Gaussian-like distributions in the operating metric data stream 600 including corresponding beginnings, endings, and peaks as well.

In other embodiments, the device operation anomaly identification and reporting engine 404 in the management system 400 may operate at block 506 to identify each peaks in an operating metric data stream by identifying a peak beginning in that operating metric data stream, identifying a peak ending in that operating metric data stream, and then identifying that peak as a maximum or midpoint between the peak beginning and peak ending. For example, in situations where the peaks in the operating metric data stream are not part of Gaussian-like distributions, the determination of the peak beginning and peak ending to estimate the peak at the maximum or midpoint between that peak beginning and peak ending may produce peak identifications that are sufficient to provide for the functionality discussed below. However, while a few specific examples of identifying peaks in operating metric data streams have been described, one of skill in the art in possession of the present disclosure will recognize that a variety of peak detection algorithms (or other techniques) for identifying peaks in a data stream may be utilized at block 506 while remaining within the scope of the present disclosure as well. Furthermore, the automatic peak identification by the management system may be performed for a large number of operating metrics generated by the operation of a device or devices, and thus the automation of that peak identification (i.e., the performance of that peak identification by the management system without contemporaneous instruction to do so from a user) may provide for the identification of peaks in operating metric data streams associated with any operating metric produced due to the operation of the device(s).

The method 500 then proceeds to block 508 where the management system determines a peak height and a peak area for each peak identified in the operating metric data stream(s). In an embodiment, at block 508, the device operation anomaly identification and reporting engine 404 in the management system 400 may determine, for the plurality of peaks identified in the operating metric data stream(s) at block 506, a peak baseline. For example, at block 508, a peak baseline may be determined as a baseline that connects the beginning of each peak in the operating metric data stream(s) with the ending of that peak in the operating metric data stream(s), and one of skill in the art in possession of the present disclosure will recognize that the ending of each peak in the operating metric data stream(s) may correspond with a beginning of a subsequent peak in that operating metric data stream(s). However, if no peak is detected between the ending of a peak and beginning of a subsequent peak, the baseline may be the same as metric curve. With reference to the example of the Gaussian-like distribution peaks in the operating metric data stream 600 of FIG. 6, a peak baseline 604 (illustrated as a dashed line in FIG. 6) for the operating metric data stream 600 is provided that extends between the beginnings and endings of each Gaussian-like distribution (e.g., between the beginning 602*a* and the ending 602*b* of the Gaussian-like distribution 602.) However, one of skill in the art in possession of the present disclosure will recognize that peak baselines may be determined in other manners while remaining within the scope of the present disclosure. Furthermore, in some embodiments the determination of the peak baseline may be omitted, and/or other techniques may be applied to the operating metric data stream in order to determine the peak heights and peaks areas discussed below.

In an embodiment, at block 508, the device operation anomaly identification and reporting engine 404 in the management system 400 may determine a peak height and a peak area for each peak identified in the operating metric data stream(s) at block 506. In some examples, the peak baseline discussed above may be utilized in determining the peak height by, for example, determining the peak height of a peak based on the distance between the peak and the point on the peak baseline that corresponds to the time at which the peak occurred. For example, with reference to FIG. 6, the peak height for the peak 602*c* in the Gaussian-like distribution 602 may be defined as the distance between the peak 602*c* and the point on the peak baseline 604 that occurs at $t_{602}$, which is the time at which the peak 602*c* occurred. One of skill in the art in possession of the present disclosure will recognize that the peak height for each of the peaks in the operating metric data stream 600 may be determined in a similar manner.

Similarly, in some examples, the peak baseline discussed above may be utilized in determining the peak area by, for example, determining the area between the portion of the peak baseline that extends between the beginning and ending of the peak, and the portion of the operating metric data stream that extends between the beginning and ending of the peak. For example, with reference to FIG. 6, the peak area for the peak 602*c* in the Gaussian-like distribution 602 may be defined as the area between the portion of the peak baseline 604 between the beginning 602*a* and the ending 602*b*, and the portion of the Gaussian-like distribution 602 between the beginning 602*a* and the ending 602*b*. One of skill in the art in possession of the present disclosure will recognize that the peak area for each of the peaks in the operating metric data stream 600 may be determined in a similar manner. Furthermore, while a specific example of the determination of peak heights and peak areas using a particular peak baseline have been illustrated and described, one of skill in the art in possession of the present disclosure will recognize that other techniques for determining peak heights and peak areas may be utilized while remaining within the scope of the present disclosure when the peak baseline is defined in a different manner, when the peak baseline is omitted, and/or when other techniques are utilized to analyze the peaks in the operating metric data stream. Further still, the automatic peak height and peak area determinations by the management system may be performed for a large number of operating metrics generated by the operation of a device or devices, and thus the automation of those peak height and peak area determinations (i.e., the performance of those peak height and peak area determinations by the management system without contemporaneous instruction to do so from a user) may provide for determinations of peak heights and peak areas in operating metric data streams associated with any operating metric produced due to the operation of the device(s).

The method 500 then proceeds to block 510 where the management system clusters the peaks identified in operating metric data stream(s) into height clusters. In some embodiment, at block 510, the device operation anomaly identification and reporting engine 404 in the management system 400 may operate to cluster peaks identified in a particular operating metric data stream into height clusters. Furthermore, in other embodiments, at block 510 the device operation anomaly identification and reporting engine 404 in the management system 400 may operate to cluster peaks identified in multiple operating metric data streams into height clusters. While not described in detail herein, a variety of clustering algorithms may be utilized at block 510 to cluster the peaks identified in the operating metric data stream(s) into height clusters, including histogram-based clustering algorithms, K-means clustering algorithms, EM clustering algorithms, affinity propagation algorithms, hierarchical agglomerative clustering algorithms (sometimes referred to as linkage clustering algorithms), and/or other clustering algorithms that would be apparent to one of skill in the art in possession of the present disclosure. With reference to the operating metric data stream 600 illustrated in FIG. 6, the clustering of the peaks identified in the operating metric data stream 600 into height clusters may result in one or more clusters with relatively larger height peaks (e.g., peaks included in the groups 606*a*, 606*b*, and 606*c* illustrated in FIG. 6), and one or more clusters with relatively lower height peaks (e.g., peaks included in the groups 608*a* and 608*b* illustrated in FIG. 6).

Figure 7:
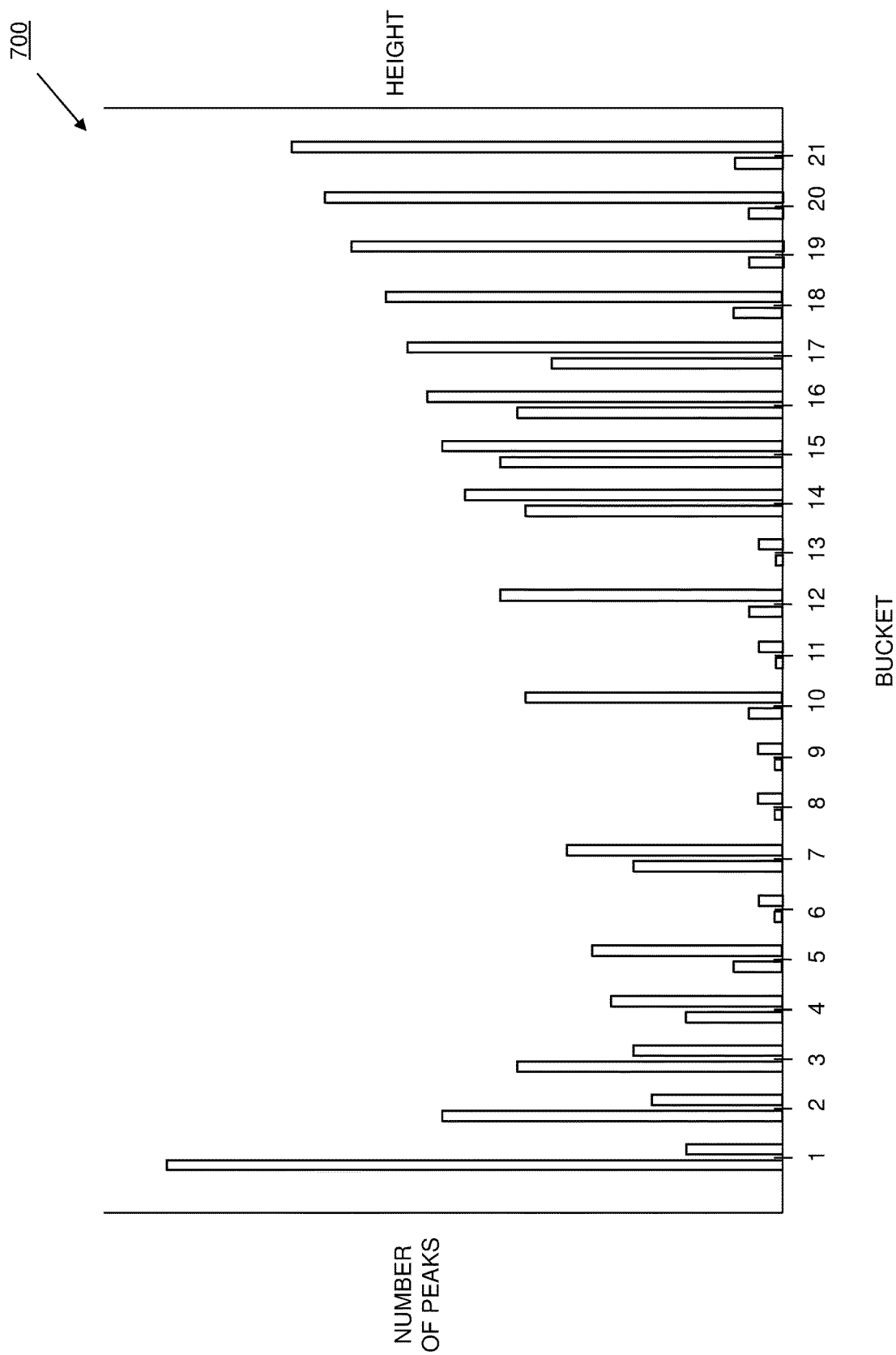
FIG. 7 is a bar chart view illustrating an embodiment of peak height clustering of the operation metric data stream of FIG. 6.

FIG. 7 illustrates an example of a height clustering bar chart 700, with buckets identified on the horizontal, and each bucket including a measure of the number of peaks (identified by the left bar in the bucket) that are of a particular height (identified by the right bar in the bucket.) In the example provided in FIG. 7, the height clustering bar chart 700 illustrates how a plurality of peaks have relatively low heights (e.g., buckets 1, 2, and 3 in FIG. 7), while a plurality of peaks have relatively large heights (e.g., buckets 14, 15, 16, and 17 in FIG. 7). As such, the height clustering bar chart 700 illustrates how two clusters of peaks may be detected in the operating metric data stream 600, a first cluster with relatively low peak heights, and a second cluster with relatively high peak heights. However, while a specific example of height clusters is illustrated and described in FIG. 7, one of skill in the art in possession of the present disclosure will recognize that height clustering may take a variety of forms depending on the operating metric data stream being analyzed, and those height clusters will fall within the scope of the present disclosure as well. Furthermore, the automatic peak height clustering by the management system may be performed for a large number of operating metrics generated by the operation of a device or devices, and thus the automation of the peak height clustering (i.e., the performance of peak height clustering by the management system without contemporaneous instruction to do so from a user) may provide for the clustering of peak heights in operating metric data streams associated with any operating metric produced due to the operation of the device(s).

The method 500 then proceeds to block 512 where the management system clusters the peak identified in operating metric data stream(s) into area clusters. In some embodiment, at block 512, the device operation anomaly identification and reporting engine 404 in the management system 400 may operate to cluster peaks identified in a particular operating metric data stream into area clusters. Furthermore, in other embodiments, at block 512 the device operation anomaly identification and reporting engine 404 in the management system 400 may operate to cluster peaks identified in multiple operating metric data streams into area clusters. While not described in detail herein, a variety of clustering algorithms may be utilized at block 512 to cluster the peaks identified in the operating metric data stream(s) into area clusters, including histogram-based clustering algorithms, K-means clustering algorithms, EM clustering algorithms, affinity propagation algorithms, hierarchical agglomerative clustering algorithms (sometimes referred to as linkage clustering algorithms), and/or other clustering algorithms that would be apparent to one of skill in the art in possession of the present disclosure. With reference to the operating metric data stream 600 illustrated in FIG. 6, the clustering of the peaks identified in the operating metric data stream 600 into area clusters may result in one or more clusters with peaks having a relatively larger area (e.g., peaks included in the groups 606a, 606b, and 606c illustrated in FIG. 6), and one or more clusters with peaks having a relatively area (e.g., peaks included in the groups 608a and 608b illustrated in FIG. 6).

Figure 8:
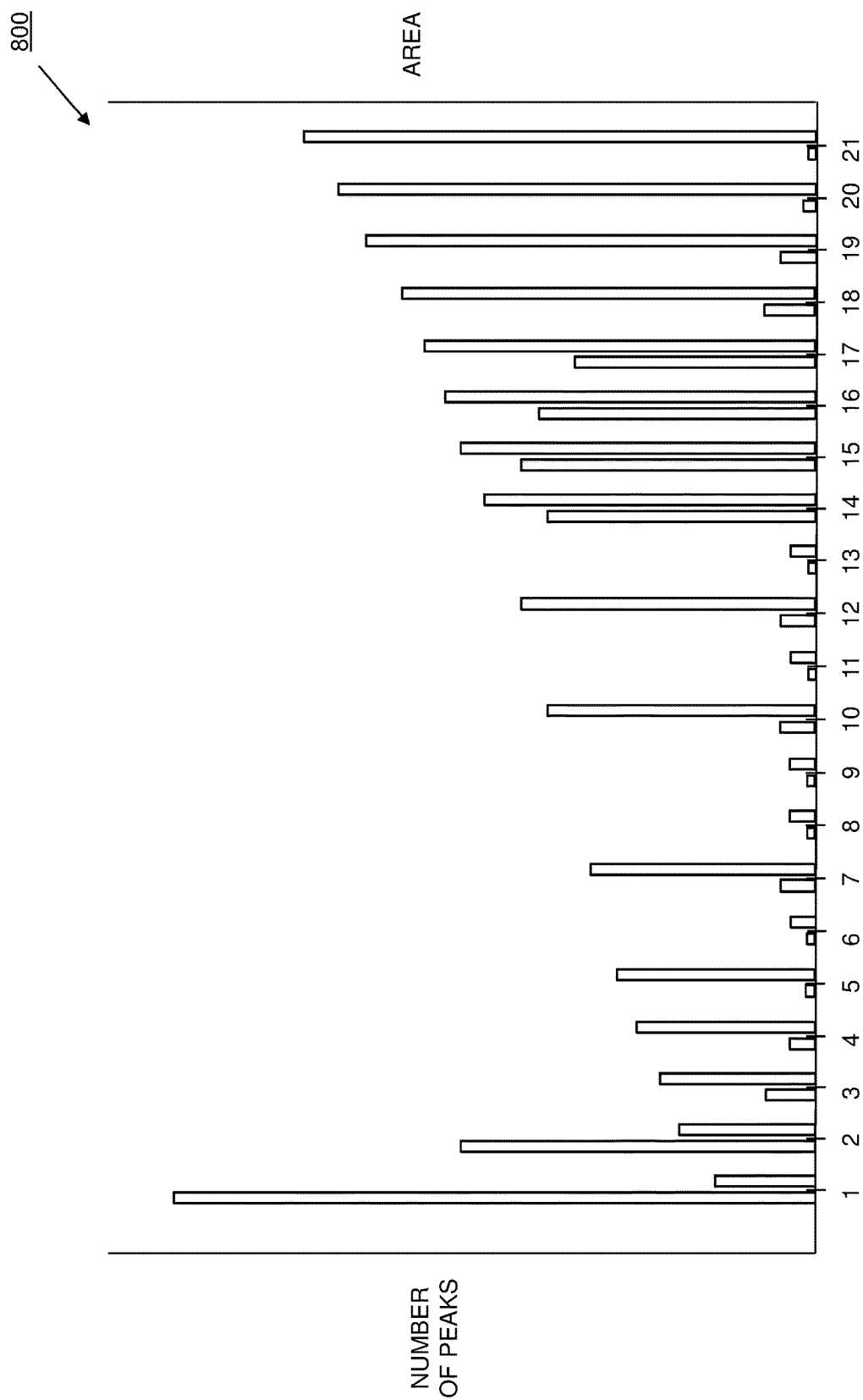
FIG. 8 is a bar chart view illustrating an embodiment of peak area clustering of the operation metric data stream.

FIG. 8 illustrates an example of an area clustering bar chart 800, with buckets identified on the horizontal, and each bucket including a measure of the number of peaks (identified by the left bar in the bucket) that include a particular area (identified by the right bar in the bucket.) In the example provided in FIG. 8, the area clustering bar chart 800 illustrates how a plurality of peaks have relatively low areas (e.g., buckets 1 and 2 in FIG. 8), while a plurality of peaks have a relatively large area (e.g., buckets 14, 15, 16, and 17 in FIG. 8). As such, the area clustering bar chart 800 illustrates how two clusters of peaks may be detected in the operating metric data stream 600, a first cluster with relatively small peak areas, and a second cluster with relatively large peak areas. However, while a specific example of area clusters is illustrated and described in FIG. 8, one of skill in the art in possession of the present disclosure will recognize that area clustering may take a variety of forms depending on the operating metric data stream being analyzed, and those area clusters will fall within the scope of the present disclosure as well. Furthermore, the automatic peak area clustering by the management system may be performed for a large number of operating metrics generated by the operation of a device or devices, and thus the automation of the peak area clustering (i.e., the performance of peak area clustering by the management system without contemporaneous instruction to do so from a user) may provide for the clustering of peak areas in operating metric data streams associated with any operating metric produced due to the operation of the device(s).

The method 500 then proceeds to block 514 where the management system automatically defines an operating periodicity for device(s) based on the height clusters and the area clusters determined for the operating metric data stream(s) received from that/those device(s). In an embodiment, at block 514, the device operation anomaly identification and reporting engine 404 in the management system 400 may operate to define an operating periodicity for the device(s) that generated the operating metric data stream(s) using the height clusters and area clusters determined at blocks 510 and 512. In some embodiments, at block 514, the device operation anomaly identification and reporting engine 404 in the management system 400 may map the height clusters and area clusters as pairs to common cluster identifiers. For example, in many situations, peaks with relatively large heights and areas may be of interest, and thus the cluster of peaks with large heights (e.g., those identified by buckets 14, 15, 16, and 17 in FIG. 7) may be paired with the cluster of peaks with large areas (e.g., those identified by buckets 14, 15, 16, and 17 in FIG. 8), and mapped to a particular peak cluster identifier (e.g., "peak cluster 1").

Following the pairing of clusters of interest as discussed above, the time distance between consecutive peaks within those clusters may be clustered into time clusters. While not described in detail herein, a variety of clustering algorithms may be utilized at block 514 to cluster the peaks of interest into time clusters, including histogram-based clustering algorithms, K-means clustering algorithms, EM clustering algorithms, affinity propagation algorithms, hierarchical agglomerative clustering algorithms (sometimes referred to as linkage clustering algorithms), and/or other clustering algorithms that would be apparent to one of skill in the art in possession of the present disclosure. In some examples, for each peak cluster, the time distances between consecutive peaks may be determined, and that time distance calculation may be based on peak height times (i.e., when peak heights are determined from Gaussian-like distributions), or may be based on peak center point times (e.g., when peak heights are estimated for non-Gaussian-like distributions.)

Figure 9:
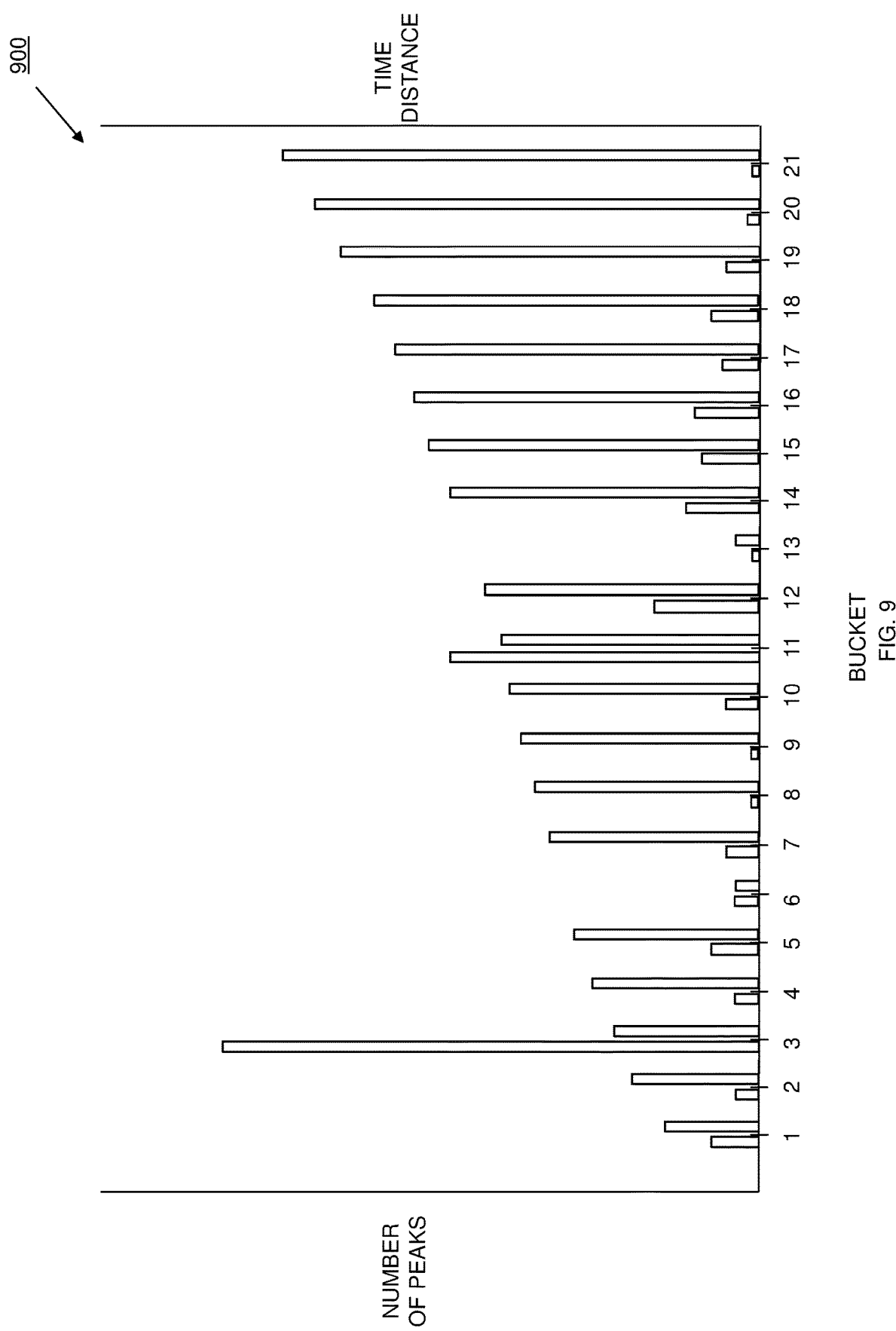
FIG. 9 is a bar chart view illustrating an embodiment of a time clustering of the operation metric data stream of FIG. 6 using the height clustering of FIG. 7 and the area clustering of FIG. 8.

FIG. 9 illustrates an example of a time clustering bar chart 900, with buckets identified on the horizontal, and each bucket including a measure of the number of peaks in the clusters of interest (identified by the left bar in the bucket) that include a particular time distance (identified by the right bar in the bucket.) In some embodiments, the cluster of interest may be (but is not limited to) the cluster of the largest peaks (peaks with large heights and areas), as the largest peaks typically identify the essential features of the metric. However, one of skill in the art in possession of the present disclosure will recognize that in other embodiments, the largest peaks do not represent the essential features of the metric, and other peak clusters will represent the essential features of the metric. In the example provided in FIG. 9, the time clustering bar chart 900 illustrates how the majority of peaks in the cluster of interest have a time distance identified in the buckets 3 and 11. As such, the time clustering bar chart 800 illustrates how the largest height and area clusters (paired as discussed above) are separated by a time distance identified in bucket 3 or bucket 11. However, while a specific example of time clusters is illustrated and described in FIG. 9, one of skill in the art in possession of the present disclosure will recognize that time clustering may take a variety of forms depending on the operating metric data stream being analyzed, and those time clusters will fall within the scope of the present disclosure as well. Furthermore, the automatic peak time distance clustering by the management system may be performed for a large number of operating metrics generated by the operation of a device or devices, and thus the automation of the peak time distance clustering (i.e., the performance of peak time distance clustering by the management system without contemporaneous instruction to do so from a user) may provide for the clustering of peak time distances in operating metric data streams associated with any operating metric produced due to the operation of the device(s).

In an embodiment, at block 514, the device operation anomaly identification and reporting engine 404 in the management system 400 may then operate to define an operating periodicity for the device(s) that generated the operating metric data stream(s) based on the time clusters. With reference to the example discussed above, the operating periodicity of the device(s) that produced the operating metric data stream 600 may be a time period associated with the time distances identified in bucket 3 and 11. In a specific example, that time distance identified in bucket 3 may be 1 day, while the time distance identified in bucket 11 may be 3 days, and one of skill in the art in possession of the present disclosure will recognize that the 1 day time difference may correspond to an operating periodicity for the device(s) that is associated with daily weekday operations (and spikes in operation) of those device(s), while the 3 day time difference may correspond to an operating periodicity for the device(s) that is associated with weekly operations (and spikes in operation) of those device(s) on days on opposite sides of a weekend. As such, the primary operating periodicity of the device(s) may be defined as 1 day (and in particular, between Monday and Friday). Furthermore, in this example, a secondary operating periodicity of the device(s) may be defined as 3 days (e.g., and in particular, between Friday and Monday.) However, while a relatively simple determination of operating periodicity has been described, one of skill in the art in possession of the present disclosure will recognize that much more complicated operating periodicities may be defined using the techniques described above while remaining within the scope of the present disclosure as well.

In a specific example of blocks 502-514 of the method 500, an operating metric that is of a periodic nature and that is produced in response to the operation of a device may generate an operating metric data stream that is transmitted to a management system and that provides a measure of the operating metric every hour over a metric period of one week. Given the metric period of one week and the sampling of the operating metric every hour, 168 samples of the operating metric may be produced over the metric period. The operating metric in each hour during the metric period may be assumed to have values from a particular range that is specific to that hour (e.g., email traffic between midnight and 1 am on Sundays may be relatively low, while email traffic between 10 am and 11 am on Thursdays may be relatively high.) Using the techniques discussed above, the operating periodicity of the device(s) producing the operating metric may be defined. Furthermore, statistics from the operating metric data stream and/or historical data for the operating metric may be determined as well, including average/expected values for the operating metric each hour, sample standard deviations from the average/expected values for the operating metric each hour, etc. As such, the operating periodicity may be defined that describes typical behavior of the operating metric, including the average/expected value of the operating metric (e.g., average/expected email traffic in any hour of the week, negative standard deviation from the average/expected email traffic in that hour of the week, positive standard deviation from the average/expected email traffic in that hour of the week, etc.) However, one of skill in the art in possession of the present disclosure will recognize that the operating periodicity of device(s) may identify a variety of values of interest that may depend on the device(s) and/or operations being monitored while remaining within the scope of the present disclosure as well.

The method 500 then proceeds to block 516 where the management system detects an operating anomaly in a device using the operating periodicity defined for that device. In an embodiment, at block 516, the device operation anomaly identification and reporting engine 404 in the management system 400 may monitor the device(s) for which the operating periodicity was determined at block 514 to detect when an operating anomaly in the device(s) has occurred. For example, at block 516, the device operation anomaly identification and reporting engine 404 in the management system 400 may monitor an operating metric that is produced by the operation of the device(s) and for which an operating periodicity was defined at block 514. As such, over any time period including a plurality of times, the device operation anomaly identification and reporting engine 404 in the management system 400 may receive or measure an observed operating metric value of the operating metric (e.g., current data being produced during a current operation of the device(s)) produced by the operation of the device(s) at a particular time, and then determine whether that observed operating metric value of the operating metric at that particular time does not correspond with an expected value for that particular time that is defined according to the operating periodicity. In a specific example, at block 516, the device operation anomaly identification and reporting engine 404 in the management system 400 may determine that the observed operating metric value of the operating metric does not correspond with an expected value that is defined according to the operating periodicity when that observed operating metric value is outside both a positive deviation from that expected value and a negative deviation from that expected value. However, while a specific example of the detection of an operating anomaly in the device(s) has been described, one of skill in the art in possession of the present disclosure will recognize that operating anomalies may be detected based on the operating periodicity determined using the techniques described herein in a variety of manners while remaining within the scope of the present disclosure as well.

The method 500 then proceeds to block 518 where the management system generates and transmits an operating anomaly alert. In an embodiment, at block 518, the device operation anomaly identification and reporting engine 404 in the management system 400 may generate and transmit an operating anomaly alert. In some examples, the operating anomaly alert may be configured to be displayed on a display screen (e.g., of an administrator computing device in order to inform a network administrator of the operating anomaly). As such, an administrator may then take actions to determine the cause of the operating anomaly and, in some cases, correct the operating anomaly in the device(s).

In other examples, the operating anomaly alert may be configured to modify the operation of the device(s) with which it is associated. With reference to the monitored system 300 illustrated in FIG. 3, the management system 310 may provide an operating anomaly alert to the device controller 304a of the monitored device 304 that is associated with that operating anomaly, and that operating anomaly alert may be configured to cause the device controller 304a to adjust the operation of the monitored device 304 (e.g., throttle the monitored device 304 when a heat generation operating metric produced by the monitored device 304 is outside of the expected heat generation operating metric.) While a few examples of operation anomaly alerts have been described, one of skill in the art in possession of the present disclosure will recognize that a variety of operation anomaly alerts may be generated in a variety of manners, and transmitted to a variety of entities, while remaining within the scope of the present disclosure as well.

Thus, systems and methods have been described that provide for the identification and reporting of device operation anomalies by automatically defining an operating periodicity for a device, and then detecting operating anomalies in the device based on that operating periodicity. Operation of the device produces a device operating metric data stream, and a management system analyzes that device operating metric data stream to identify peaks present in the device operating metric data stream, as well as determine a peak height and a peak area for each of those peaks. The management device may then cluster the peaks into height clusters (i.e., based on the height determined for each peak) and area clusters (i.e., based on the area determined for each peak), and define an operating periodicity for the device using the height clusters and area clusters. Using that operating periodicity, the management system may then detect operating anomalies in the device by, for example, detecting when an observed operating metric value is outside of a positive and negative deviation from an expected operating metric value according to the operating periodicity of the device. When the operating anomaly is detected, the management system may generate and transmit an operating anomaly alert that reports the operating anomaly in the device. As such, the determination of periodic device metrics may be automated and used to identify and report anomalies in those device operating metrics, allowing for device operation anomaly identification and reporting in systems that produce relatively large amounts of metrics.

Furthermore, the techniques of the present disclosure may be utilized to discover "super periods" of operating periodicity for the device(s). In an embodiment, the techniques described above may be applied to a "secondary" operating metric data stream that is derived from the "primary" operating metric data stream(s) discussed above, as per the equation:

$$G(x) = \sum_{z=x-p}^{x} F(z)$$

With x representing a time, p representing a defined operating periodicity, and F(z) representing a value of the original metric at the time t. With F(z) providing a stream of discreet values at regular times, the resulting function is made by summation of metric values at times that are between a time x back to a time (x−p).

One of skill in the art in possession of the present disclosure will recognize that the super-peaks produced by the equation above will not have a Gaussian distribution. However, as discussed above, peak center points may be estimated as the maximum or midpoint between peak beginnings and peak endings in such situations. The peaks identified in this manner may then be time clustered as discussed above in order to determine time distances between the super peak clusters.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A device operation anomaly identification and reporting system, comprising:
   a device that is configured to operate and, in response, generate an operating metric data stream; and
   a management system that is coupled to the device, wherein the management system is configured to:
      receive, from the device, the operating metric data stream;
      analyze the operating metric data stream over a time period;
      identify a plurality of peaks present in the operating metric data stream during the time period;
      determine, for each of the plurality of peaks, a peak height and a peak area;
      cluster the plurality of peaks into a plurality of height clusters based on the peak height determined for each of the plurality of peaks;
      cluster the plurality of peaks into a plurality of area clusters based on the peak area determined for each of the plurality of peaks;
      define an operating periodicity for the device based on the plurality of height clusters and the plurality of area clusters by:
         mapping a set of height clusters of interest that are included in the plurality of height clusters and a set of area clusters of interest that are included in the plurality of area clusters as pairs to a common cluster identifier,
         clustering a time distance between consecutive peaks within the mapping of the set of height clusters of interest and the set of area clusters of interest into a plurality of time clusters, and
         defining the operating periodicity based on the plurality of time clusters;
      detect an operating anomaly in the device using the operating periodicity defined for the device; and
      generate and transmit an operating anomaly alert that reports the operating anomaly in the device.

2. The system of claim 1, wherein the management system is configured to:
   determine, for the plurality of peaks present in the operating metric data stream during the time period, a peak baseline, wherein the peak height the peak area for each of the plurality of peaks is determined using the peak baseline.

3. The system of claim 1, wherein the identification of each of the plurality of peaks in the operating metric data stream during the time period includes:

identifying a Gaussian-like distribution in the operating metric data stream; and identifying the peak of the Gaussian-like distribution in the operating metric data stream.

4. The system of claim 1, wherein the identification of each of the plurality of peaks in the operating metric data stream during the time period includes:

identifying a peak beginning in the operating metric data stream;

identifying a peak ending in the operating metric data stream; and identifying the peak in the operating metric data stream as at least one of a maximum or a midpoint between the peak beginning and the peak ending.

5. The system of claim 1, wherein the defining the operating periodicity for the device based on the plurality of height clusters includes:

clustering time distances between each of the plurality of peaks within each of the plurality of height clusters.

6. An Information Handling System (IHS), comprising:

a processing system; and a memory system that is coupled to the processing system and that includes instructions that, when executed by the processing system, cause the processing system to provide a device operation anomaly identification and reporting engine that is configured to:

receive, from a device, an operating metric data stream that is generated by the device during operation of the device;

analyze the operating metric data stream over a time period;

identify a plurality of peaks present in the operating metric data stream during the time period;

determine, for each of the plurality of peaks, a peak height and a peak area;

cluster the plurality of peaks into a plurality of height clusters based on the peak height determined for each of the plurality of peaks;

cluster the plurality of peaks into a plurality of area clusters based on the peak area determined for each of the plurality of peaks;

define an operating periodicity for the device based on the plurality of height clusters and the plurality of area clusters by:

mapping a set of height clusters of interest that are included in the plurality of height clusters and a set of area clusters of interest that are included in the plurality of area clusters as pairs to a common cluster identifier, clustering a time distance between consecutive peaks within the mapping of the set of height clusters of interest and the set of area clusters of interest into a plurality of time clusters, and defining the operating periodicity based on the plurality of time clusters;

detect an operating anomaly in the device using the operating periodicity defined for the device; and generate and transmit an operating anomaly alert that reports the operating anomaly in the device.

7. The IHS of claim 6, wherein the device operation anomaly identification and reporting engine is configured to:

determine, for the plurality of peaks present in the operating metric data stream during the time period, a peak baseline, wherein the peak height the peak area for each of the plurality of peaks is determined using the peak baseline.

8. The IHS of claim 6, wherein the identification of each of the plurality of peaks in the operating metric data stream during the time period includes:

identifying a Gaussian-like distribution in the operating metric data stream; and identifying the peak of the Gaussian-like distribution in the operating metric data stream.

9. The IHS of claim 6, wherein the identification of each of the plurality of peaks in the operating metric data stream during the time period includes:

identifying a peak beginning in the operating metric data stream;

identifying a peak ending in the operating metric data stream; and identifying the peak in the operating metric data stream as at least one of a maximum and a midpoint between the peak beginning and the peak ending.

10. The IHS of claim 6, wherein the defining the operating periodicity for the device includes:

defining, for each of a plurality of times, an expected value of the operating metric, a positive deviation from the expected value of the operating metric, and a negative deviation of the expected value of the operating metric, and wherein the detecting the operating anomaly in the device includes:

detecting, at a particular time included in the plurality of times, that an observed operating metric value is outside of the positive deviation from the expected value of the operating metric and the negative deviation of the expected value of the operating metric.

11. A method for device operation anomaly identification and reporting:

receiving, by a management system from a device, an operating metric data stream that is generated by the device during operation of the device;

analyzing, by the management system, the operating metric data stream over a time period;

identifying, by the management system, a plurality of peaks present in the operating metric data stream during the time period;

determining, by the management system for each of the plurality of peaks, a peak height and a peak area;

clustering, by the management system, the plurality of peaks into a plurality of height clusters based on the peak height determined for each of the plurality of peaks;

clustering, by the management system, the plurality of peaks into a plurality of area clusters based on the peak area determined for each of the plurality of peaks;

defining, by the management system, an operating periodicity for the device based on the plurality of height clusters and the plurality of area clusters by:

mapping a set of height clusters of interest that are included in the plurality of height clusters and a set of area clusters of interest that are included in the plurality of area clusters as pairs to a common cluster identifier, clustering a time distance between consecutive peaks within the mapping of the set of height clusters of interest and the set of area clusters of interest into a plurality of time clusters; and defining the operating periodicity based on the plurality of time clusters;

detecting, by the management system, an operating anomaly in the device using the operating periodicity defined for the device; and generating and transmitting, by the management system, an operating anomaly alert that reports the operating anomaly in the device.

12. The method of claim 11, further comprising:
determining, by the management system for the plurality of peaks present in the operating metric data stream during the time period, a peak baseline, wherein the peak height the peak area for each of the plurality of peaks is determined using the peak baseline.

13. The method of claim 11, wherein the identification of each of the plurality of peaks in the operating metric data stream during the time period includes:
identifying, by the management system, a Gaussian-like distribution in the operating metric data stream; and
identifying, by the management system, the peak of the Gaussian-like distribution in the operating metric data stream.

14. The method of claim 11, wherein the identification of each of the plurality of peaks in the operating metric data stream during the time period includes:
identifying, by the management system, a peak beginning in the operating metric data stream;
identifying, by the management system, a peak ending in the operating metric data stream; and
identifying, by the management system, the peak in the operating metric data stream as at least one of a maximum and a midpoint between the peak beginning and the peak ending.

15. The method of claim 11, wherein the defining the operating periodicity for the device based on the plurality of height clusters includes:
clustering time distances between each of the plurality of peaks within each of the plurality of height clusters.

16. The method of claim 11, wherein the defining the operating periodicity for the device includes:
defining, by the management system for each of a plurality of times, an expected value of the operating metric, a positive deviation from the expected value of the operating metric, and a negative deviation of the expected value of the operating metric, and wherein the detecting the operating anomaly in the device includes:
detecting, by the management system at a particular time included in the plurality of times, that an observed operating metric value is outside of the positive deviation from the expected value of the operating metric and the negative deviation of the expected value of the operating metric.

\* \* \* \* \*